US009669825B1

(12) United States Patent
Dudar

(10) Patent No.: US 9,669,825 B1
(45) Date of Patent: Jun. 6, 2017

(54) PERIODIC ENGINE LUBRICATION FOR PHEVS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/004,674

(22) Filed: Jan. 22, 2016

(51) Int. Cl.
*B60W 20/40* (2016.01)
*B60K 6/445* (2007.10)
*B63H 5/10* (2006.01)
*F01L 9/04* (2006.01)
*B60W 10/06* (2006.01)
*B60W 10/08* (2006.01)
*F02M 25/08* (2006.01)
*F01M 1/02* (2006.01)
*F02D 41/26* (2006.01)

(52) U.S. Cl.
CPC ........... *B60W 20/40* (2013.01); *B60W 10/06* (2013.01); *B60W 10/08* (2013.01); *F01M 1/02* (2013.01); *F02D 41/26* (2013.01); *F02M 25/08* (2013.01); *B60W 2900/00* (2013.01); *B60Y 2200/92* (2013.01); *B60Y 2306/03* (2013.01); *F02D 2250/41* (2013.01); *Y10S 903/93* (2013.01)

(58) Field of Classification Search
CPC ......... B60W 20/40; B60K 6/445; B63H 5/10; F02M 25/0854; F02N 11/003; F02D 41/0097; F01L 9/04
See application file for complete search history.

(56) References Cited

U.S. PATENT DOCUMENTS

| 1,971,620 | A | * | 8/1934 | Pierce | ...................... | B63H 5/10 |
| | | | | | | 123/190.3 |
| 6,237,546 | B1 | * | 5/2001 | Gander | ..................... | F01L 9/04 |
| | | | | | | 123/41 E |
| 6,763,298 | B2 | | 7/2004 | Boggs et al. | | |
| 7,091,839 | B2 | | 8/2006 | Situ et al. | | |
| 7,233,845 | B2 | | 6/2007 | Veinotte | | |
| 7,898,405 | B2 | | 3/2011 | Burke et al. | | |

(Continued)

OTHER PUBLICATIONS

Dudar, Aed M., "System and Methods for Purging Residual Exhaust and Uncombusted Fuel to a Fuel Vapor Canister," U.S. Appl. No. 14/810,177, filed Jul. 27, 2015, 48 pages.

(Continued)

*Primary Examiner* — Yuri Kan
(74) *Attorney, Agent, or Firm* — James Dottavio; McCoy Russell LLP

(57) ABSTRACT

Methods and systems are provided for periodically activating a vehicle engine such that issues that may occur responsive to engine inactivity, such as rust and the sticking of components of the valve train, may be prevented. In one example, a vehicle engine increment off timer is used to monitor a duration wherein the vehicle engine has not been active, and responsive to expiration of the timer, spinning the engine unfueled in reverse while concurrently activating an onboard pump to direct air and fuel vapor to be stored in a fuel vapor canister. In this way, periodic engine lubrication operations may be conducted that do not require the use of fueled engine operation, thereby improving fuel economy and reducing undesired evaporative emissions.

18 Claims, 8 Drawing Sheets

(56) References Cited

U.S. PATENT DOCUMENTS

| | | | |
|---|---|---|---|
| 8,181,631 B2* | 5/2012 | Bohr | F02M 25/0854 |
| | | | 123/520 |
| 8,479,849 B2 | 7/2013 | Leone | |
| 8,739,766 B2* | 6/2014 | Jentz | F02N 11/003 |
| | | | 123/516 |
| 9,080,519 B2 | 7/2015 | Howell et al. | |
| 2006/0190145 A1 | 8/2006 | Yamamoto et al. | |
| 2011/0095878 A1 | 4/2011 | Skaff et al. | |
| 2011/0120789 A1* | 5/2011 | Teraya | B60K 6/445 |
| | | | 180/65.25 |
| 2013/0152905 A1 | 6/2013 | Woods et al. | |
| 2014/0107903 A1* | 4/2014 | Kawazu | F02D 41/0097 |
| | | | 701/101 |

OTHER PUBLICATIONS

Dudar, Aed M., "System and Methods for Purging an Air Intake System Hydrocarbon Trap to a Fuel Vapor Canister," U.S. Appl. No. 15/042,416, filed Feb. 12, 2016, 42 pages.

* cited by examiner

US 9,669,825 B1

PERIODIC ENGINE LUBRICATION FOR PHEVS

FIELD

The present description relates generally to methods and systems for controlling a vehicle engine to spin unfueled to perform periodic lubrication cycles.

BACKGROUND/SUMMARY

Vehicles may use an engine oil system to lubricate and/or cool various components of an internal combustion engine during engine operation. The oil system for an engine supplies oil from a reservoir, often referred to as a sump, to various components of the engine requiring a supply of oil, such as bearings, hydraulic valve mechanisms, piston cooling jets, and piston ring contact areas of engine cylinders. However, if the engine is allowed to remain idle for extended periods of time moisture may enter the cylinders, possibly causing rust to develop, and the valve train parts (e.g., camshaft, valves, chains, piston rings) may become sticky. As such, when engines are planned to be stored for a long period of time, it is typical for vehicle operators to remove the spark plugs and inject oil inside the cylinders to keep them lubricated and to prevent rust buildup. Further, customers may elect to turn the engine over every few months in order to keep the valve train lubricated.

Plug-in hybrid electric vehicles (PHEVs) present a unique challenge to maintaining proper engine lubrication and overall engine upkeep, as PHEVs have the capability to operate significant distances in pure electric mode, without running the engine. For example, some customers may take mostly short trips, and may consistently plug in the vehicle between trips, such that the engine is almost never needed for battery charging. To avoid the issues associated with long periods of engine inactivity in PHEVs, the engine may be operated periodically even when it is not required for battery charging.

U.S. Pat. No. 8,479,849 teaches starting a vehicle engine to reduce effects of continued engine off operation, such as when a vehicle is consistently charged and the driver travels only a short distances. Further, the engine start may be delayed until selected conditions occur, such that the engine start and engine operation may be masked from the vehicle operator. However, the inventors herein have recognized potential issues with such a method. For example, starting and operating the engine to prevent potential degradation may reduce fuel economy and contribute to evaporative emissions. Additionally, while U.S. Pat. No. 8,479,849 teaches masking engine operation by starting the engine under select vehicle operating conditions, engine starting may still be noticeable, resulting in vehicle operator dissatisfaction. In one example, the vehicle operator may exert some control over when the engine may be activated responsive to an indication that engine operation is desired, however if the driver fails to activate the engine, the engine may still be activated without vehicle operator action.

Thus, the inventors herein have developed systems and methods to at least partially address the above issues. In one example, the issues described above may be addressed by a method including, propelling a motor vehicle by at least an internal combustion engine which rotates in a default direction by combusting fuel; and responsive to an indication of a vehicle engine-off duration greater than an engine-off threshold, spinning (rotating) the engine unfueled in a reverse direction opposite the default direction.

As one example, a vehicle may be configured to store fuel vapors in a fuel vapor canister configured in an evaporative emissions control system, and wherein spinning the engine unfueled in reverse may include routing air and fuel vapors to the fuel vapor canister. In some examples, air and fuel vapors may be further directed to the fuel vapor canister via the activation of an onboard pump configured to draw air and fuel vapors from the air intake system hydrocarbon trap in the intake manifold, and crankcase of the engine. During spinning the engine unfueled in reverse, an oil pump may be activated such that lubrication of the engine is performed. In this way, responsive to an indication of a vehicle-off duration greater than the engine-off threshold, the engine may be operated wherein lubrication of the engine may be performed, thereby preventing potential issues that may occur in the engine responsive to prolonged engine-off conditions. Furthermore, by activating the engine to spin unfueled in reverse, fuel economy may be improved as fueled engine operation is not performed to conduct the engine lubrication operation. Finally, by spinning the engine unfueled in reverse while concurrently activating an onboard pump, fuel vapors may be drawn to the fuel vapor canister, thereby preventing undesired evaporative emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

This detailed description relates to systems and methods for periodically lubricating a vehicle engine responsive to an indication that the vehicle engine has not been activated for a duration of time. Specifically, the description relates to a plug-in hybrid electric vehicle, configured such that the vehicle may be powered solely by battery power, wherein an increment off timer may be used to indicate the need for a vehicle engine lubrication operation. The engine lubrication operation may be conducted by operating an electric motor to spin the engine in reverse, in conjunction with activation of an onboard vacuum pump, such that air and fuel vapors may be routed to a fuel vapor canister in an evaporative emissions system of the vehicle. The systems and methods may be applied to a vehicle system capable of spinning an engine unfueled in reverse with an electric motor, such as the hybrid vehicle system depicted in FIG. 1. The engine may be coupled to an emissions control system and an exhaust system, as depicted in FIG. 2. The engine may comprise a plurality of combustion cylinders, such as the combustion cylinder depicted in FIG. 3. The direction of the electric motor may be reversed using an H-bridge circuit, such as the circuit shown in FIG. 4, thus allowing the engine to be spun in reverse. A method for indicating whether a vehicle engine increment off timer has elapsed, is illustrated in FIG. 5. If, during the course of a vehicle operating in battery mode, the engine is activated, engine operation may be controlled according to the method depicted in FIG. 6, and the engine off increment timer reset responsive to a completion of engine operation. Responsive to an indication that the engine increment off time has expired, a vehicle engine lubrication operation may be performed, according to the method depicted in FIG. 7. A timeline for vehicle operation including conducting a vehicle engine lubrication operation responsive to an indication that a vehicle increment off timer has expired is illustrated in FIG. 8.

Figure 1:
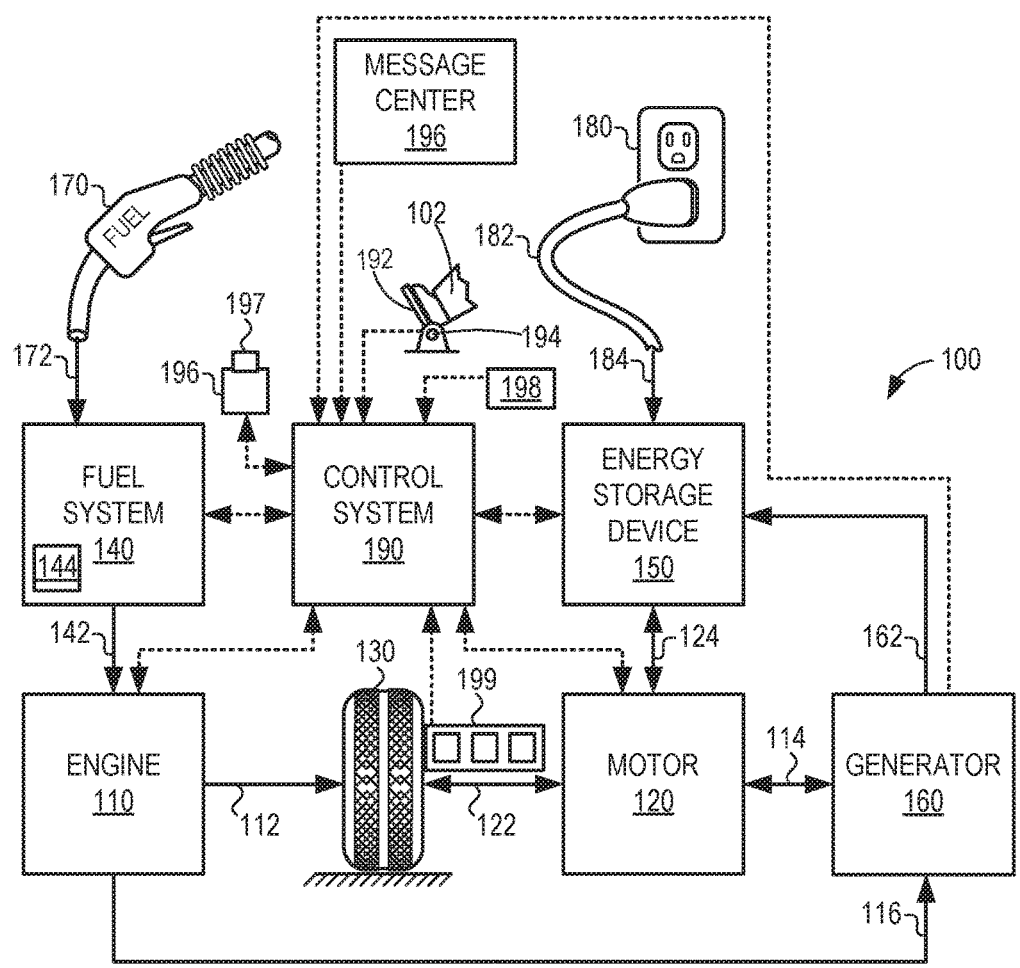
FIG. 1 schematically shows an example vehicle propulsion system.
Figure 2:
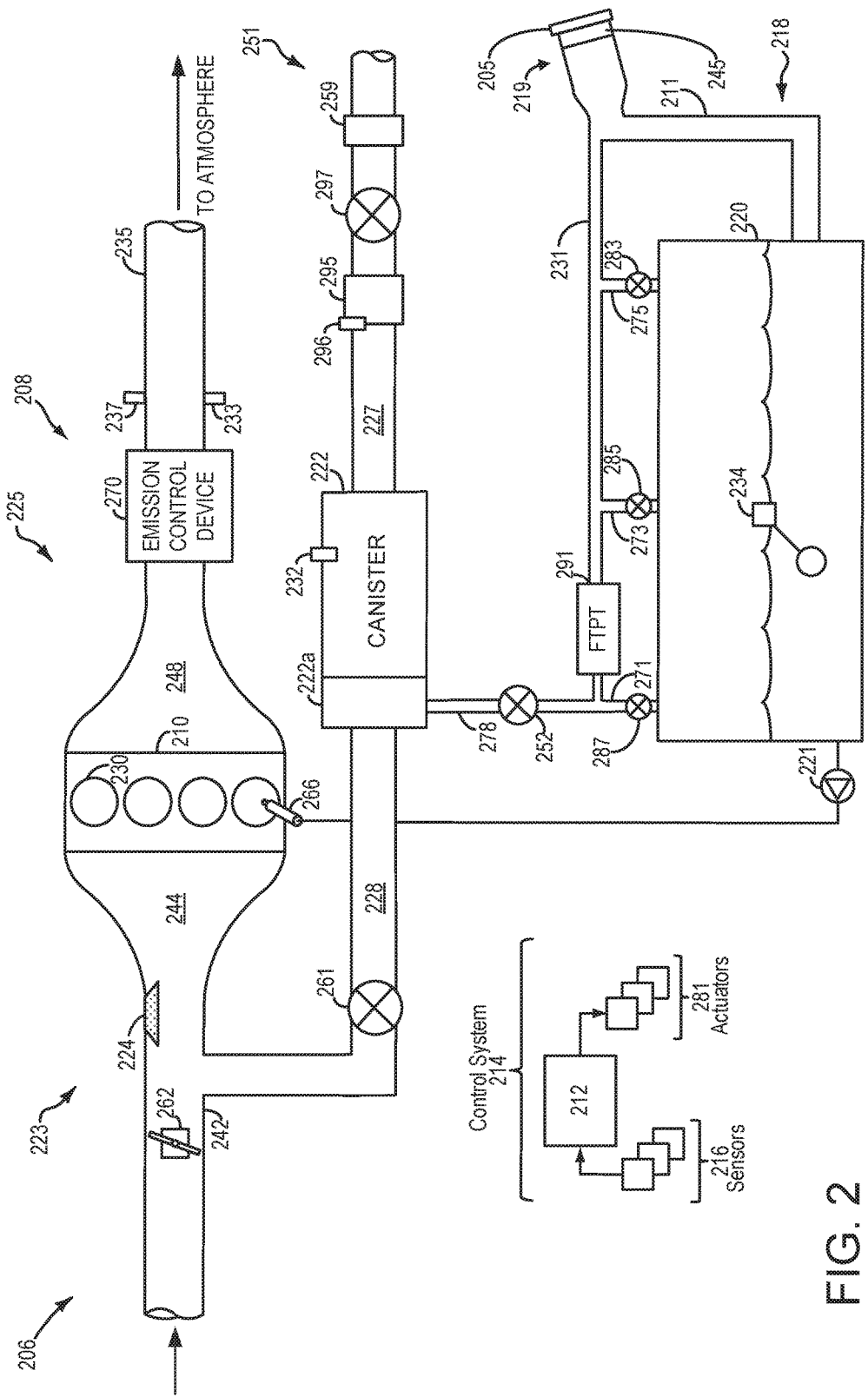
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and a canister vent valve 297. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 5-7.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Evaporative emissions detection routines may be intermittently performed by controller 212 on fuel system 218 to confirm that evaporative emissions are not entering the atmosphere. As such, evaporative emissions detection routines may be performed while the engine is off (engine-off evaporative emissions test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. Evaporative emissions tests may be performed by an evaporative level check monitor (ELCM) 295 communicatively coupled to controller 212. ELCM 295 may be coupled in vent 227, between canister 222 and the atmosphere. ELCM 295 may include a vacuum pump for applying negative pressure to the fuel system when administering an evaporative emissions test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, emission system degradation may be diagnosed.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Hybrid electric vehicles (HEVs) and plug-in hybrid electric vehicles (PHEVs) are unique in that a battery may be operated to spin the engine unfueled in forward or reverse modes. As will be described in further detail below, spinning the engine unfueled in reverse may function to lubricate the engine responsive to an indication of prolonged engine-off conditions. By spinning the engine unfueled in reverse while concurrently activating an onboard pump (e.g., 295), commanding open a canister purge valve (e.g., 261), and commanding closed a throttle (e.g., 262), air an fuel vapors may be drawn into the fuel vapor canister (e.g., 222) for storage. In this way, the engine may be periodically lubricated without impacting fuel economy or releasing undesired emissions to atmosphere.

Figure 3:
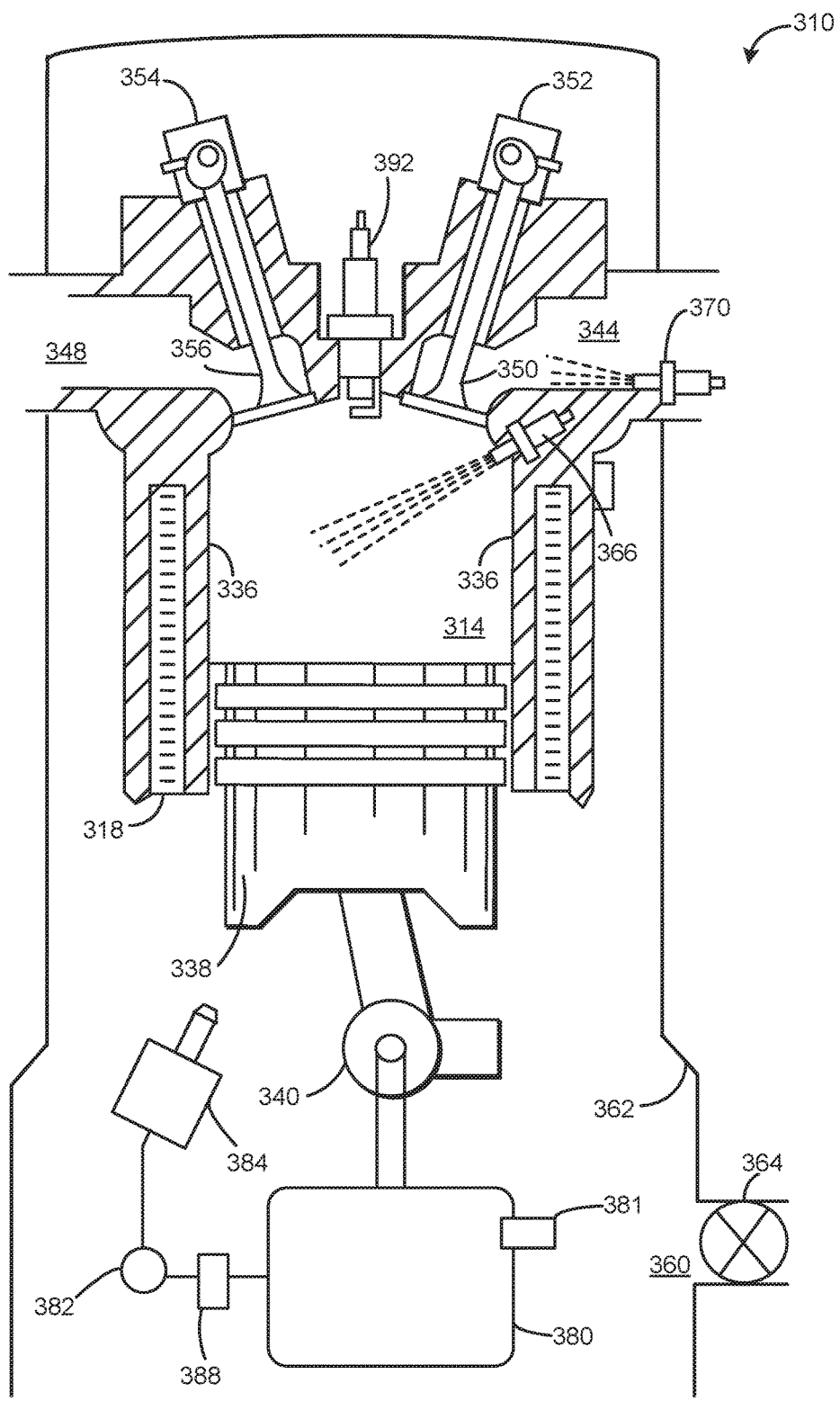
FIG. 3 schematically shows an example combustion cylinder for an engine.

FIG. 3 depicts an example embodiment of a combustion chamber or cylinder that may be included in engine 310, which may be configured similarly to engine 110 as described herein, and depicted in FIG. 1 and/or engine 210, as described herein and depicted in FIG. 2. Cylinder (i.e., combustion chamber) 314 may include combustion chamber walls 336 with piston 338 positioned therein. Piston 338 may be coupled to crankshaft 340 so that reciprocating motion of the piston is translated into rotational motion of the crankshaft. Crankshaft 340 may be coupled to at least one drive wheel of the passenger vehicle via a transmission system. Further, a starter motor may be coupled to crankshaft 340 via a flywheel to enable a starting operation of engine 310, and/or to rotate the engine in an unfueled mode.

Cylinder 314 can receive intake air via intake air passage 344, which may be one of a plurality of intake air passages coupled to cylinder 314. Intake air passage 344 may communicate with other cylinders of engine 310 in addition to cylinder 314. In some embodiments, one or more of the intake passages may include a boosting device such as a turbocharger or a supercharger. Exhaust passage 348 can receive exhaust gases from cylinder 314 as well as from other cylinders of engine 310.

Each cylinder of engine 310 may include one or more intake valves and one or more exhaust valves. For example, cylinder 314 is shown including at least one intake poppet valve 350 and at least one exhaust poppet valve 356 located at an upper region of cylinder 314. In some embodiments, each cylinder of engine 310, including cylinder 314, may include at least two intake poppet valves and at least two exhaust poppet valves located at an upper region of the cylinder.

Intake valve 350 may be controlled by a controller via actuator 352. Similarly, exhaust valve 356 may be controlled by a controller via actuator 354. During some conditions, the controller may vary the signals provided to actuators 352 and 354 to control the opening and closing of the respective intake and exhaust valves. The position of intake valve 350 and exhaust valve 356 may be determined by respective valve position sensors (not shown). The valve actuators may be of the electric valve actuation type or cam actuation type, or a combination thereof. The intake and exhaust valve timing may be controlled concurrently or any of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by a controller to vary valve operation. For example, cylinder 314 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 314 can have a compression ratio, which is the ratio of volumes when piston 338 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 310 may include a spark plug 392 for initiating combustion. An ignition system (not shown) can provide an ignition spark to cylinder 314 via spark plug 392 in response to a spark advance signal from a controller, under select operating modes. However, in some embodiments, spark plug 392 may be omitted, such as where engine 310 may initiate combustion by auto-ignition or by injection of fuel as may be the case with some diesel engines.

In some embodiments, each cylinder of engine 310 may be configured with one or more fuel injectors for providing fuel thereto. As a non-limiting example, cylinder 314 is shown including two fuel injectors 366 and 370. Fuel injector 366 is shown coupled directly to cylinder 314 for injecting fuel directly therein in proportion to a pulse width of a signal received from a controller via an electronic driver. In this manner, fuel injector 366 provides what is known as direct injection (hereafter referred to as "DI") of fuel into cylinder 314. While FIG. 3 shows injector 366 as a side injector, it may also be located overhead of the piston, such as near the position of spark plug 392. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 366 from a high pressure fuel system including a fuel tank, fuel pumps, a fuel rail, etc., as depicted in FIG. 2. Alternatively, fuel may be delivered by a single stage fuel pump at lower pressure, in which case the timing of the direct fuel injection may be more limited during the compression stroke than if a high pressure fuel system is used.

Fuel injector 370 is shown arranged in intake air passage 344, rather than in cylinder 314, in a configuration that provides what is known as port injection of fuel (hereafter referred to as "PFI") into the intake port upstream of cylinder 314. Fuel injector 370 may inject fuel in proportion to a pulse width of a signal received from a controller via an electronic driver.

Fuel may be delivered by both injectors to the cylinder during a single cycle of the cylinder. For example, each injector may deliver a portion of a total fuel injection that is combusted in cylinder 314. Further, the distribution and/or relative amount of fuel delivered from each injector may vary with operating conditions such as described herein below. The relative distribution of the total injected fuel among injectors 366 and 370 may be referred to as a first injection ratio. For example, injecting a larger amount of the fuel for a combustion event via (port) injector 370 may be an example of a higher first ratio of port to direct injection, while injecting a larger amount of the fuel for a combustion event via (direct) injector 366 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

Fuel injectors 366 and 370 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 370 and 366, different effects may be achieved. Fuel injectors 366 and 370 may be configured to inject fuel from the same fuel tank, from different fuel tanks, from a plurality of the same fuel tanks, or from an overlapping set of fuel tanks.

A positive crankcase ventilation (PCV) system, may be coupled to the engine intake so that gasses in the crankcase 362 may be vented in a controlled manner from the crankcase. Engine 310 may include a PCV line 360 in order to vent gasses out of the crankcase 362 and into the intake manifold. In some examples PCV line 360 may include PCV valve 364, which may be an electronically controlled valve that is controlled a controller. Additionally or alternatively, PCV line 360 may include a one-way valve (that is, a passive valve that tends to seal when flow is in the opposite direction). For example, PCV valve 364 may comprise a vacuum-actuated valve that opens responsive to a vacuum in the intake manifold.

Variable flow oil pump 380 may be coupled to crankshaft 340 to provide rotary power to operate the variable flow oil pump 380. In one example, the variable flow oil pump 380 includes a plurality of internal rotors (not shown) that are eccentrically mounted. At least one of the internal rotors can be controlled by controller (e.g., 212) to change the position of that rotor relative to one or more other rotors to adjust an output flow rate of the variable flow oil pump 380 and thereby adjust the oil pressure. For example, the electronically controlled rotor may be coupled to a rack and pinion assembly that is adjusted via the controller to change the position of the rotor. The variable flow oil pump 380 may selectively provide oil to various regions and/or components of engine (e.g., 110) to provide cooling and lubrication. The output flow rate or oil pressure of the variable flow oil pump 380 can be adjusted by the controller to accommodate varying operating conditions to provide varying levels of cooling and/or lubrication. Further, the oil pressure output from the variable flow oil pump 380 may be adjusted to reduce oil consumption and/or reduce energy consumption by the variable flow oil pump 380.

It will be appreciated that any suitable variable flow oil pump configuration may be implemented to vary the oil pressure and/or oil output flow rate.

In some embodiments, instead of being coupled to the crankshaft 340 the variable flow oil pump 380 may be coupled to a camshaft, or may be powered by a different power source, such as a motor or the like. Additionally, in a hybrid electric vehicle, there may be more than one oil pump, wherein one oil pump may be configured to be mechanically driven by the engine, and wherein a second oil pump may be electrically driven by a motor. In other examples, there may be only one oil pump and it may be driven solely by an electric motor. In still other examples, there may be more than one oil pump, wherein the one or more oil pumps may all be driven by an electric motor. Further, while the description herein comprises a variable flow oil pump configuration, the description is not meant to be limiting. As such, any suitable oil pump configuration known in the art may be used with regard to the systems and methods described herein.

Oil injector 384 may be coupled downstream of an output of the variable flow oil pump 380 to selectively receive oil from the variable flow oil pump 380. In some embodiments, the oil injector 384 may be incorporated into the combustion chamber walls 336 of the engine cylinder and may receive oil from galleries formed in the walls. The oil injector 384 may be operable to inject oil from the variable flow oil pump 380 onto an underside of piston 338. The oil injected by oil injector 384 provides cooling effects to the piston 338. Furthermore, through reciprocation of piston 338, oil is drawn up into combustion chamber 314 to provide cooling effects to walls of the combustion chamber 314. Moreover, oil injector 384 provides oil for lubrication of an interface between piston 338 and combustion chamber 314.

A valve 382 may be positioned between the output of the variable flow oil pump 380 and the oil injector 384 to control flow of oil to the oil injector 384. In some embodiments, the check valve may be integrated into the assembly of the oil injector 384. In some embodiments, the valve 382 may be an electronically actuatable valve that is controlled by the controller. The valve 382 may be actuatable to enable/disable operation of oil injector 384.

Sensor 381 may provide an indication of oil temperature or oil viscosity to the controller. One or more of these sensors may provide an indication of an engine temperature that may be used by the controller to control operation of the oil injector 384. The controller may receive signals indicative of an ambient temperature from an ambient temperature sensor (not shown). For example, the engine temperature and/or the ambient temperature may be used to control oil injection.

Further, the controller may receive an indication of oil pressure from pressure sensor 388 positioned downstream of an output of variable flow oil pump 380. The oil pressure indication may be used by the controller to control adjustment of oil pressure by varying an output flow rate of variable flow oil pump 380.

As described above, FIG. 3 shows only one cylinder of a multi-cylinder engine, and each cylinder may similarly include its own set of intake/exhaust valves, fuel injector, spark plug, oil injector etc.

When the engine is spun in the default direction, a vacuum is generated in the intake manifold, while a pressure is generated in the exhaust system. However, if the engine is spun in reverse, a vacuum (negative pressure) is generated in the exhaust system, while a positive pressure is generated in the intake manifold. More specifically, as the engine spins in reverse, the opening of a cylinder exhaust valve brings fresh air and exhaust into the cylinder, and a subsequent opening of the cylinder intake valve evacuates the cylinder to the intake manifold. As described briefly above and which will be described in more detail below, responsive to an indication that the vehicle engine has been inactive for a duration, the engine may be spun unfueled, and without ignition spark, in a reverse direction than the default direction for fueled engine operation. By operating the engine unfueled in a reverse direction, air and fuel vapor may be directed to a fuel vapor canister configured within an evaporative emissions system of the vehicle. In one example, an onboard pump (e.g., 295) may additionally be activated to apply vacuum on the evaporative emissions control system and intake manifold of the engine. Accordingly, activation of the vacuum may further serve to route air and fuel vapor to the fuel vapor canister. As such, the engine may be activated to prevent potential issues resulting from prolonged engine inactivation, without the use of fuel. This may serve to improve fuel economy, and by spinning the engine in reverse and directing fuel vapors to the fuel vapor canister, undesired evaporative emissions may be prevented.

Figure 4A:
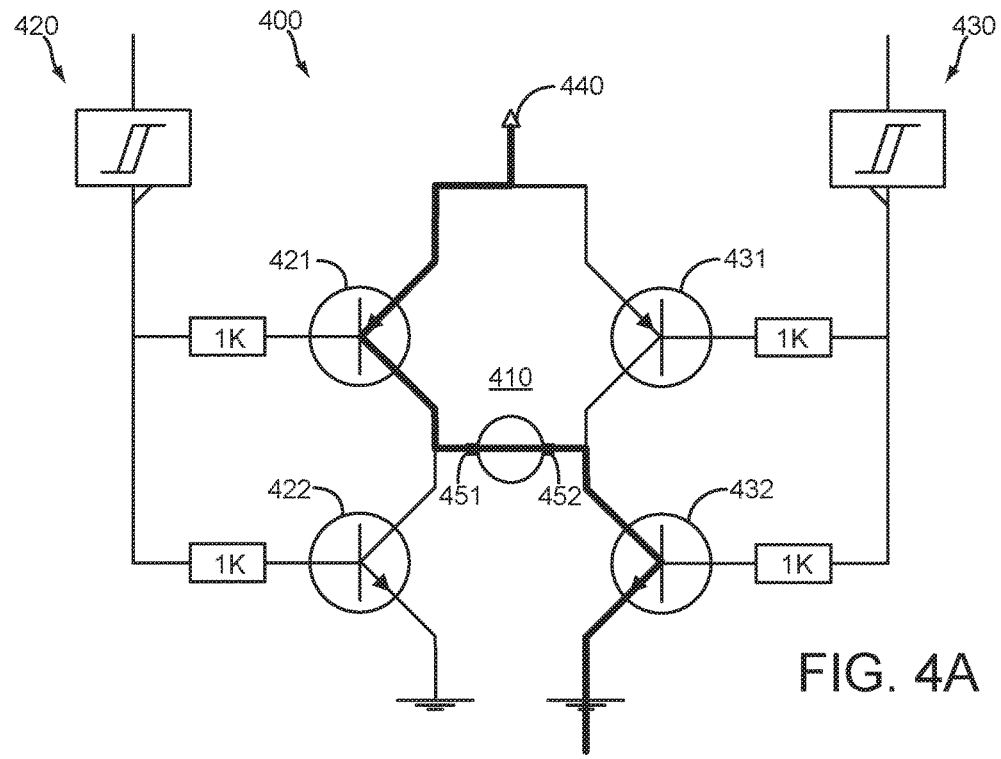
FIGS. 4A and 4B show a schematic depiction of an electronic circuit configured to reverse the spin orientation of an electric motor.
Figure 4B:
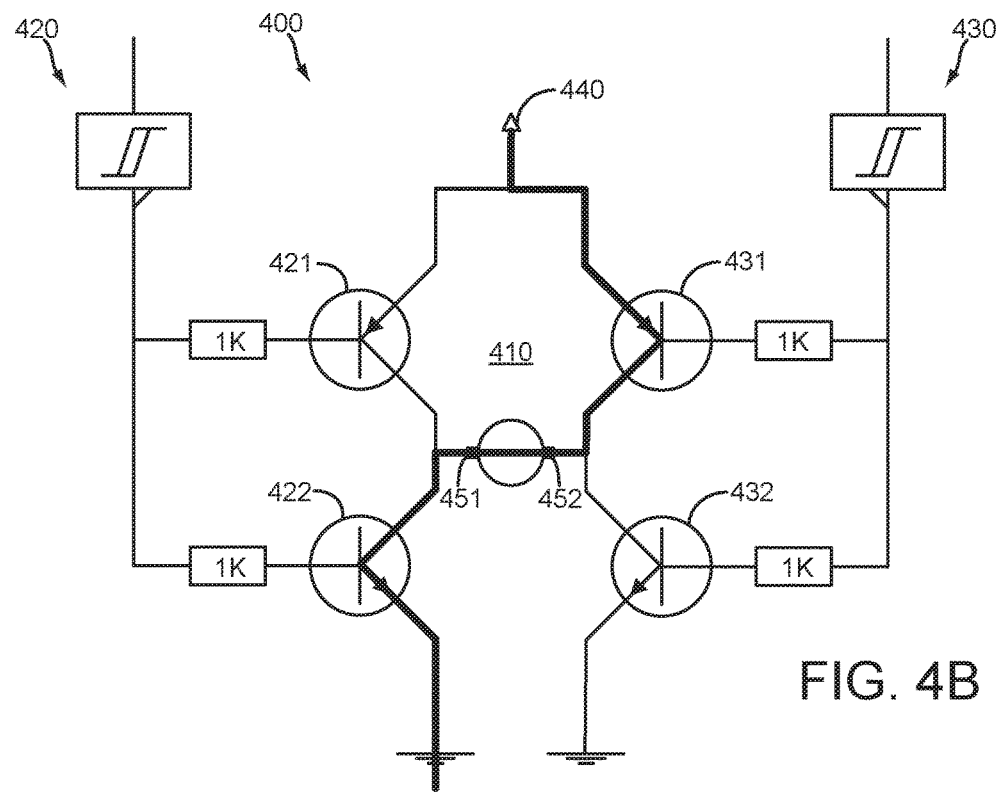
Figure 5:
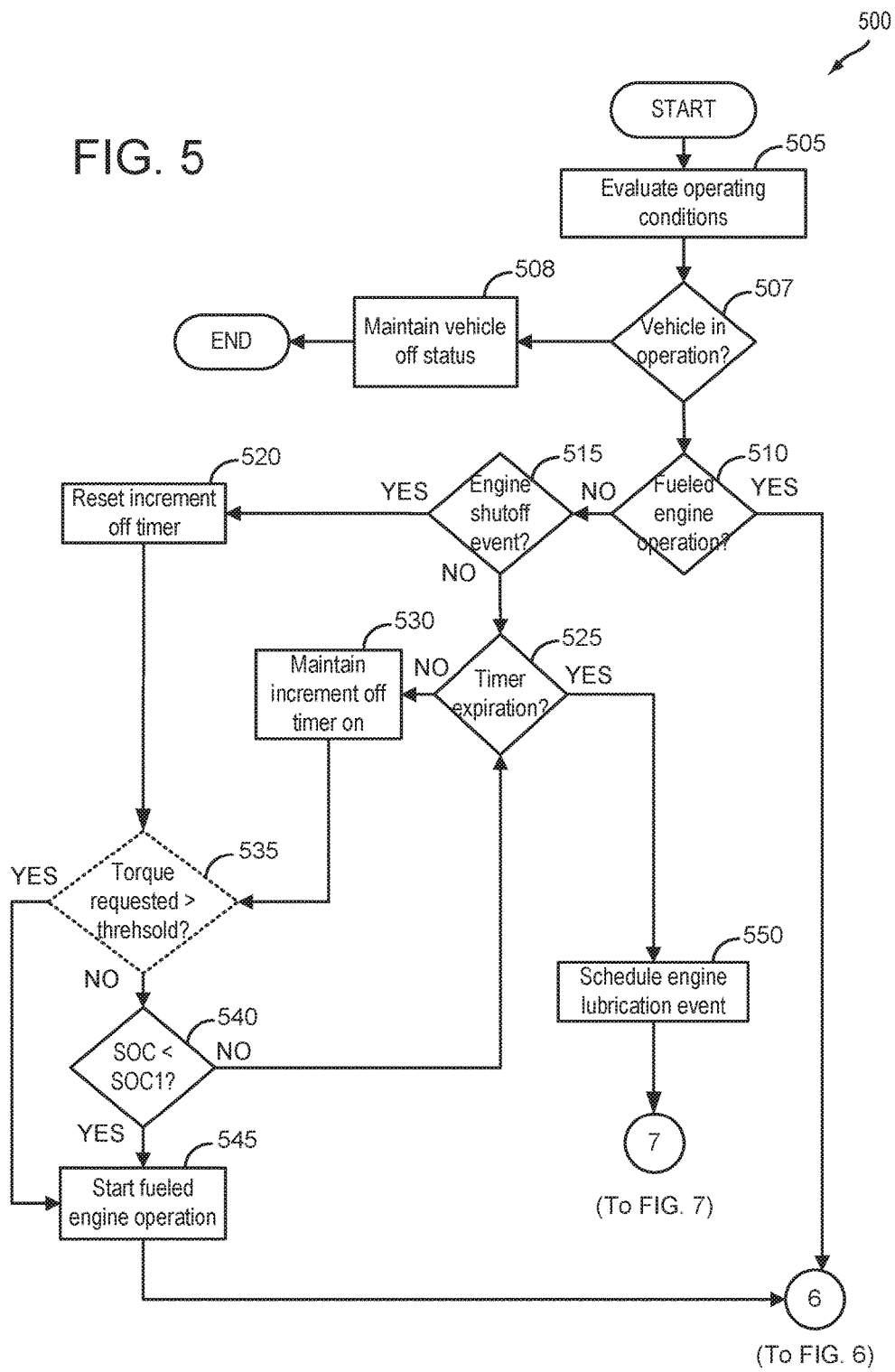
FIG. 5 shows a flowchart for a high level example method for indicating whether an increment off timer for an engine-off duration has expired.

FIGS. 4A and 4B show an example circuit 400 that may be used for reversing a spin orientation of an electric motor. Circuit 400 schematically depicts an H-Bridge circuit that may be used to run a motor 410 in a first (forward) direction and alternately in a second (reverse) direction. Circuit 400 comprises a first (LO) side 420 and a second (HI) side 430. Side 420 includes transistors 421 and 422, while side 430 includes transistors 431 and 432. Circuit 400 further includes a power source 440.

In FIG. 4A, transistors 421 and 432 are activated, while transistors 422 and 431 are turned off. In this confirmation, the left lead 451 of motor 410 is connected to power source 440, and the right lead 452 of motor 410 is connected to ground. In this way, motor 400 may run in a forward direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle.

In FIG. 4B, transistors 422 and 431 are activated, while transistors 421 and 432 are turned off. In this confirmation, the right lead 452 of motor 410 is connected to power source 440, and the left lead 451 of motor 410 is connected to ground. In this way, motor 400 may run in a reverse direction, and the engine may accordingly be rotated in a reverse direction.

Turning now to FIG. 5, a flow chart for a high level example method 500 for implementing an increment off timer for a vehicle engine is shown. More specifically, method 500 may be used to indicate whether an engine shutdown event occurs, and if so, an increment off timer may be set such that the duration of time that the engine remains off may be determined. If the engine is activated, for example by a torque request greater than a threshold, or to charge a vehicle battery supply, the increment off timer may be reset. However, if the increment off timer exceeds a predetermined time duration threshold, an engine lubrication event may be scheduled. In this way, responsive to an indication of vehicle engine inactivity for a predetermined duration, the engine may be activated in order to lubricate the engine, thereby preventing potential engine issues such as rust, or the sticking of valve train components. Method 500 will be described with reference to the systems described herein and shown in FIGS. 1-4B, though it should be understood that similar methods may be applied to other systems without departing from the scope of this disclosure. Method 500 may be carried out by a controller, such as controller 212 in FIG. 2, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system actuators such as the fuel injectors (e.g., 266), etc., according to the method below.

Method 500 begins at 505 and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Proceeding to 507, method 500 may include indicating whether the vehicle is in operation. For example, vehicle operation may comprise a key-on condition, wherein the vehicle is operating solely by battery power, solely by combustion from an engine, or a combination of battery power and engine combustion. If at 507 it is indicated that the vehicle is not in operation, method 500 may proceed to 508 and may include maintaining the vehicle off status of the vehicle. In some examples, maintaining the vehicle off status may include maintaining the status of the engine, evaporative emissions control system, and fuel system. Further, in a vehicle that is monitoring engine-off duration via an increment off timer, the increment off timer may continue to monitor the engine-off condition during the time the vehicle is not in operation. Method 500 may then end.

Returning to 507, if it is indicated that the vehicle is in operation, method 500 may proceed to 510. At 510, method 500 may include determining whether fueled engine operation is indicated (e.g., whether the engine is spinning under power generated from combustion in the engine). For example, an indication of fueled engine operation may include an indication that the fuel injectors are supplying pressurized fuel to the engine cylinders, and that the vehicle is not operating solely on battery power. If fueled engine operation is indicated at 510, method 500 may proceed to FIG. 6 where it may be determined whether the engine is operating based on a request for torque greater than a threshold, or to charge a vehicle battery, and wherein engine operation may be controlled accordingly.

If, at 510 fueled engine operation is not indicated, method 500 may proceed to 515. At 515, method 500 may include indicating whether the fueled engine operation has just been completed. In other words, at 515, method 500 may include indicating whether fueled vehicle engine operation has just been completed, or whether the vehicle engine has been off for some time. If, at 515, method 500 indicates that a fueled engine shutoff event has just occurred, method 500 may proceed to 520. At 520, method 500 may include resetting an increment off timer responsive to the indication that a fueled engine operation was just completed. Returning to 515, if a fueled engine shutoff event is not indicated, but rather the vehicle engine has been off for some time, method 500 may proceed to 525. At 525, method 500 may include indicating whether the increment off timer has expired. For example, as briefly described above, responsive to an engine shutoff event, the increment off timer may be reset. The increment off timer may be set to a predetermined duration, wherein the timer may continue to run responsive to an indication that fueled vehicle engine operation (or unfueled engine operation as will be described in more detail below) has not occurred. The predetermined time duration that the increment off timer may be set to may comprise 30 days, in one example. Other examples comprising any number of days greater than, or less than 30 days have additionally been contemplated. For example, depending on the environment, the predetermined time duration may be adjusted accordingly. The predetermined time duration may be lower (e.g., less than 30 days) in colder climates, and greater (e.g., more than 30 days) in warmer climates. Alternately, the predetermined time duration may be greater in colder climates and lower in warmer climates. Furthermore, in some examples the predetermined duration may comprise a set number of miles driven by the vehicle during an engine-off condition. As such, at 525, if it is indicated that the increment off timer has not expired, method 500 may proceed to 530. Accordingly, at 530, method 500 may include maintaining the increment off timer on, as the engine is indicated to be off and the increment off timer has not been indicated to be expired.

Responsive to either an indication of the increment off timer being reset at 520, or being maintained on at 530, method 500 may proceed to 535. At 535, while the vehicle is in operation and fueled engine operation is not occurring, it may be determined whether a driver request (such as a driver-generated vehicle output wheel torque request) is above a threshold. Such a determination may be used where the engine is configured to directly provide drive torque to the vehicle propulsion system, and may be omitted when the engine is not so configured, such as in a series hybrid configuration. As such, FIG. 5 shows 535 as a dashed block.

If, at 535, it is indicated that a driver-generated vehicle output wheel torque request is not above the threshold, method 500 may proceed to 540. At 540, method 500 may include determining whether a battery state of charge (SOC) is less than a first minimum threshold SOC1. In some examples, SOC1 may represent a state of charge below which engine operation is requested to maintain sufficient mobility of the vehicle responsive to the operator commands. The first minimum threshold may be a function of operating conditions of the system, vehicle, and/or battery, such as based on battery temperature, etc. Another potential reason to start the engine, may be fuel vapor generation from fuel tank 220 which may be beyond the storage capacity of canister 222 such as during extremely hot weather conditions.

If at 535 it is indicated that driver-requested vehicle output wheel torque request is above the threshold, or if at 540 it is indicated that battery SOC is less than the first minimum threshold SOC1, method 500 may proceed to 545. At 545, method 500 may include the control system discontinuing the battery mode and activating fueled engine combustion operation with the engine rotating in a default direction. Responsive to starting the engine, method 500 may proceed to FIG. 6, where it may be determined whether the engine is operating based on a request for torque, or to charge a vehicle battery, and wherein engine operation may be controlled accordingly, as described above.

Returning to 540, if it is indicated that a driver requested vehicle output wheel torque request is not above the threshold, and if the battery SOC is not less than the first minimum threshold SOC1, method 500 may return to 525, where it may be determined whether the engine increment off timer has expired. If at 525 it is indicated that the engine increment off timer has not expired, method 500 may again proceed to 530, where the increment off timer is maintained on, and may further include monitoring torque requests and battery SOC, as described above.

Alternatively, if at 525 it is indicated that the engine increment off time has expired, method 500 may proceed to 550. At 550, method 500 may include scheduling an engine lubrication event. For example, as the engine increment off timer has been indicated to be expired, the engine may be susceptible to issues related to prolonged engine off conditions, such as rust and/or sticking of the valve train components. As such, at 550, method 500 may include setting a flag at the controller to schedule an engine lubrication event responsive to vehicle engine lubrication conditions being met. Subsequent to setting the flag, method 500 may accordingly proceed to FIG. 7, where it may be determined whether engine lubrication conditions are met, and if so, wherein engine lubrication may be conducted according to the method described therein.

Figure 6:
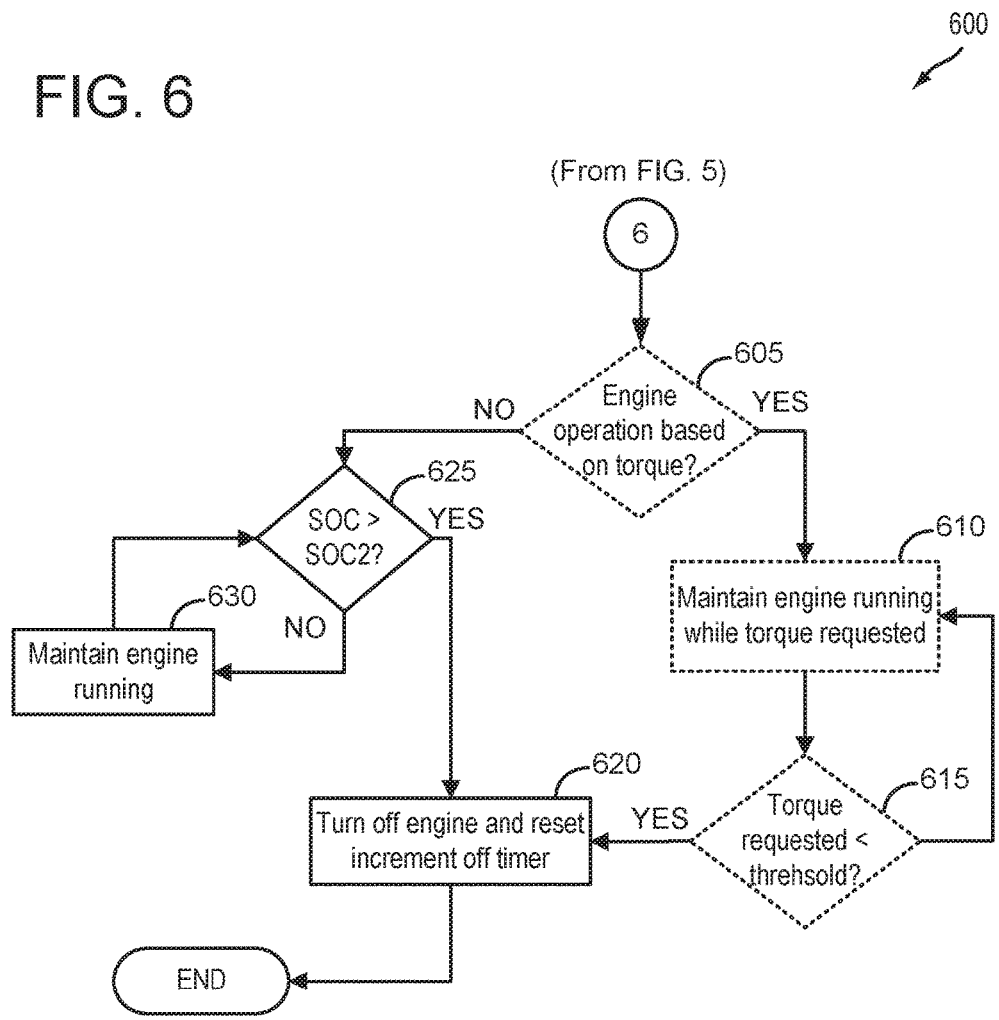
FIG. 6 shows a flowchart for a high level example method continuing from FIG. 5 for controlling engine operation, and resetting a vehicle engine increment off timer responsive to engine operation.

Turning now to FIG. 6, a flow chart for a high level example method 600 for controlling fueled engine operation is shown. More specifically, method 600 continues from method 500, and may be used to indicate whether fueled engine operation is the result of driver requested vehicle output wheel torque greater than a threshold, or the result of a battery state of charge (SOC) less than a first minimum SOC1 or other reasons such as excessive fuel vapor generation. Depending on the circumstances for engine activation, engine operation may be adjusted accordingly. Furthermore, subsequent to engine operation, an engine off increment timer may be reset. In this way, responsive to fueled engine operation, the engine off increment timer may be reset such that engine-off conditions may be monitored, and responsive to engine off duration exceeding a predetermined engine off increment timer, an engine lubrication operation performed. Method 600 will be described with reference to the systems described herein and shown in FIGS. 1-4B, though it should be understood that similar methods may be applied to other systems without departing from the scope of this disclosure. Method 600 may be carried out by a controller, such as controller 212 in FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system actuators such as the fuel injectors (e.g., 266), etc., according to the method below.

Method 600 begins at 605 and may include determining whether the fueled engine operation was requested based on driver requested torque. If so, method 600 may proceed to 610, and may include maintaining fueled engine operation while the driver requested torque continues. Proceeding to 615, it may be indicated whether driver requested torque is less than a threshold. If driver requested torque is not less than the threshold at 615, method 600 may return to 610 where the engine may be maintained running. However, if at 615 driver requested torque is less than the threshold, method 600 may proceed to 620 and may include turning off the engine. Further, at 620, as a fueled engine-on event was recently completed, method 600 may include resetting an increment off timer. In other words, as a driver requested torque event resulted in fueled engine operation, the engine and its associated components have undergone a lubrication event. As such, the increment off timer may be reset. Method 600 may then end. As noted above, the determination of whether fueled engine operation is based on driver requested torque may be omitted in the example of a series hybrid vehicle configuration. Accordingly, steps 605, 610, and 615 are represented as dashed blocks.

Returning to 605, if fueled engine operation is not indicated to be the result of driver requested torque, or in the case of a series hybrid, if fueled engine operation is not based on torque, method 600 may proceed to 625. At 625, method 600 may include determining whether a battery SOC is above a second upper threshold SOC2, which may indicate that the battery is fully charged. If at 625 it is indicated that the battery SOC is not greater than SOC2, method 600 may proceed to 630 and may include maintaining fueled engine operation. Fueled engine operation may be maintained until battery SOC is greater than or equal to SOC2. As such, responsive to an indication that battery SOC is greater than or equal to SOC2 at 625, method 600 may proceed to 620. As described above, at 620 method 600 may include turning off the engine, and resetting the increment off timer responsive to the completed fueled engine event. Method 600 may then end.

Figure 7:
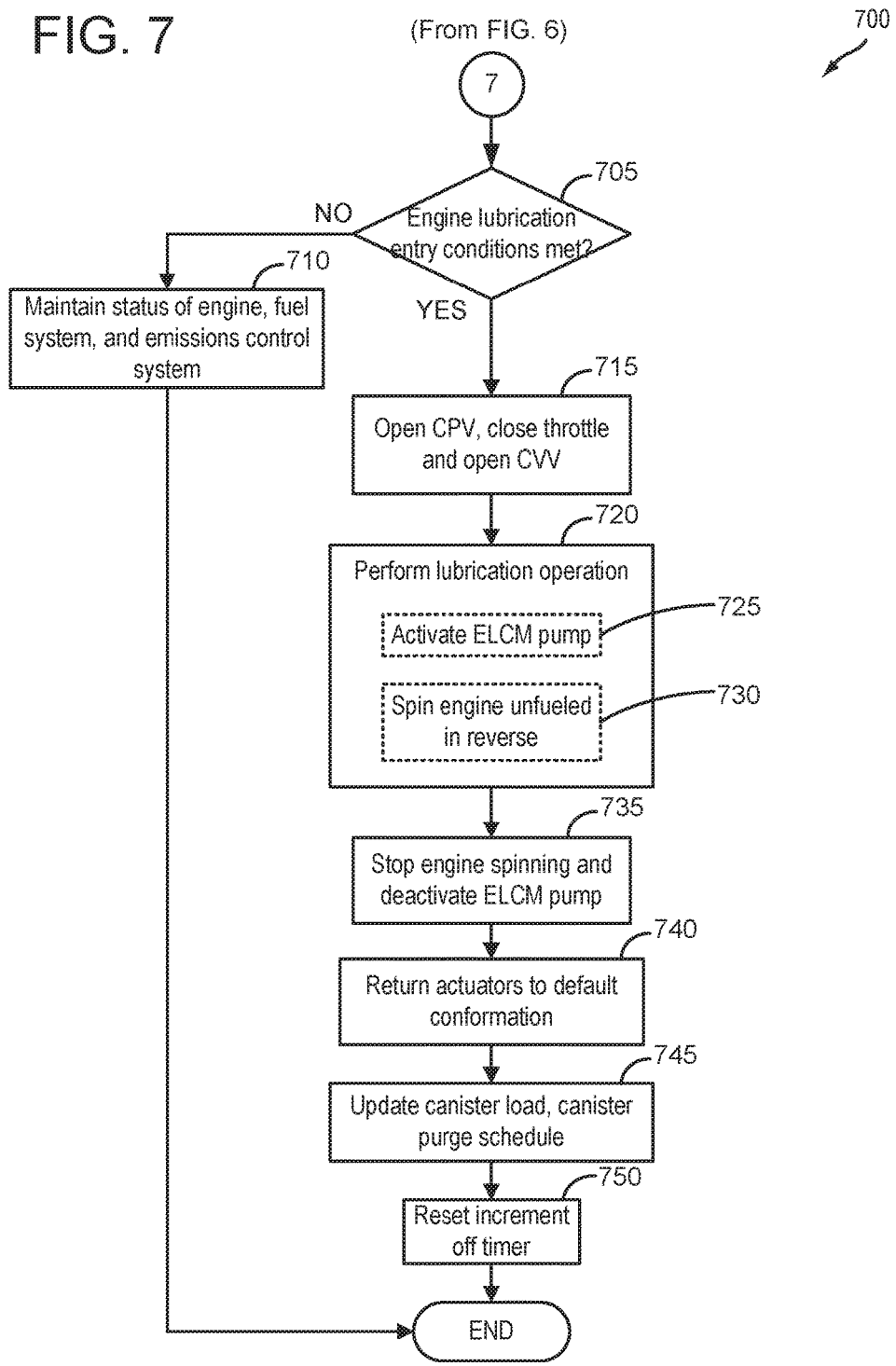
FIG. 7 shows a flowchart for a high level example method continuing from FIG. 5 for performing a vehicle engine lubrication operation.
Figure 8:
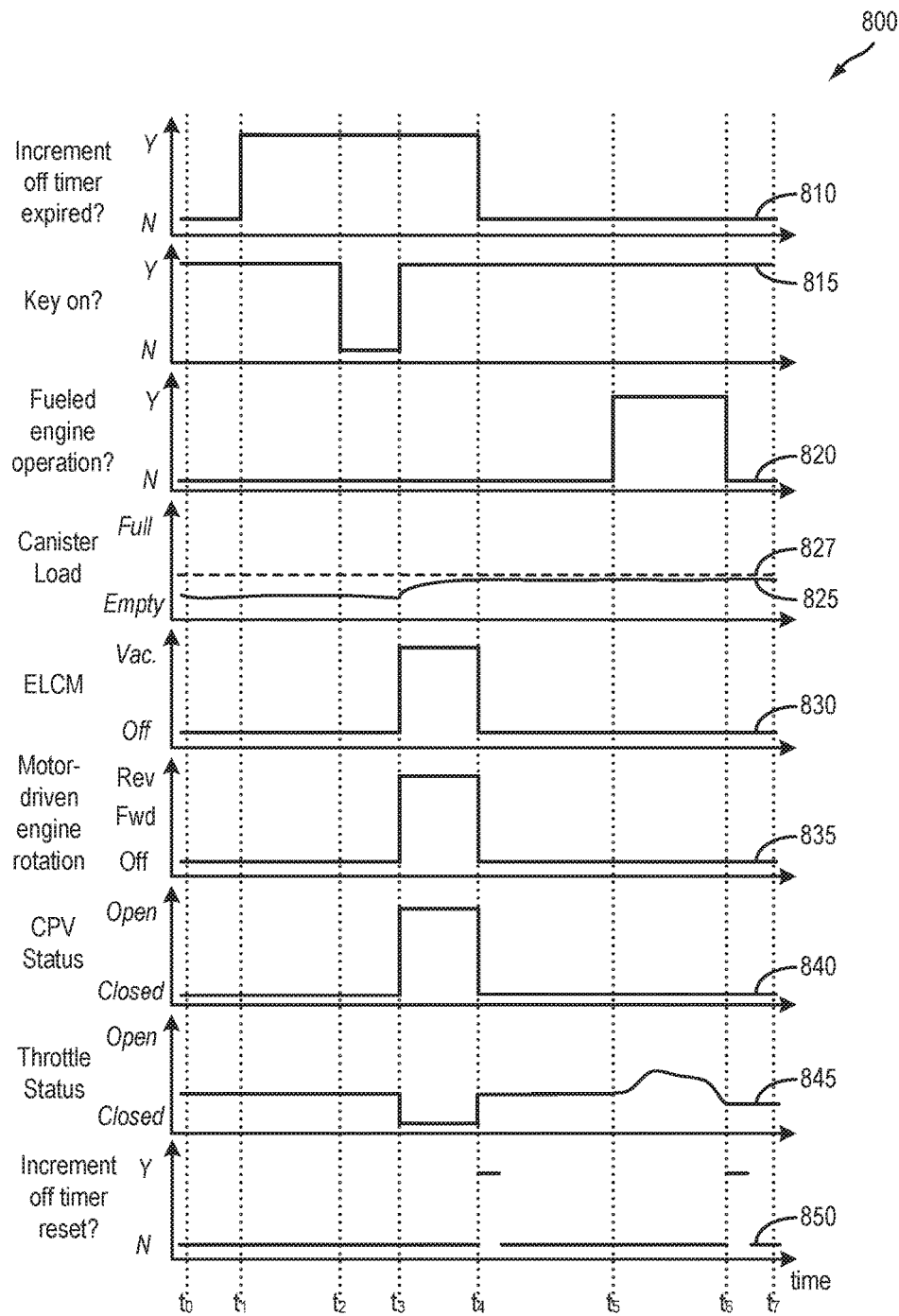
FIG. 8 shows an example timeline for performing a vehicle engine lubrication operation, according to the methods depicted in FIGS. 5-7.

Turning now to FIG. 7 a flow chart for a high level example method 700 for performing an engine lubrication operation is shown. More specifically, method 700 continues from method 500 wherein it was determined that an engine increment off timer has expired, and accordingly an engine lubrication operation is scheduled to be performed responsive to engine lubrication operation entry conditions being met. As such, method 700 includes determining whether engine lubrication conditions are met, and responsive to engine lubrication conditions being met, performing the engine lubrication operation by operating an electric motor to spin the engine in reverse. Reverse engine spinning may be conducted concurrently with activation of a pump positioned in the vehicle evaporative emissions control system (e.g., 295), the opening of a canister purge valve (CPV) (e.g., 261), closing of a throttle (e.g., 262), and commanding open or maintaining open the canister vent valve (CVV) (e.g., 297) to direct air/vapor flow to a fuel vapor canister (e.g., 222). Method 700 will be described with reference to the systems described herein and shown in FIGS. 1-4B, though it should be understood that similar methods may be applied to other systems without departing from the scope of this disclosure. Method 700 may be carried out by a controller, such as controller 212 in FIG. 2, and may be stored at the controller as executable instructions in non-transitory memory. Instructions for carrying out method 700 and the rest of the methods included herein may be executed by a controller based on instructions stored on a memory of the controller and in conjunction with signals received from sensors of the engine system, such as the sensors described above with reference to FIG. 1 and FIG. 2. The controller may employ fuel system and evaporative emissions system actuators such as the CPV, CVV, throttle, motor, etc., according to the methods described below.

Method 700 begins at 705 and includes indicating whether engine lubrication conditions are met. For example, engine lubrication conditions being met may include a key-on event wherein a canister load is indicated to be below a threshold level. More specifically, the canister load may be stored at a controller (e.g., 212), and may be determined based on quantities of refueling vapor adsorbed by the canister, and quantities of hydrocarbons that have been desorbed from the canister during purge events. The canister load threshold may be based on an amount of uncombusted fuel and exhaust gas expected to be remaining within the engine and exhaust system. If a temperature sensor is coupled to the fuel vapor canister, temperature changes within the canister during loading and purge events may be used to determine the canister load. The canister load may additionally or alternatively be determined based on fuel tank pressure prior to and during refueling events, readings from hydrocarbon sensors and/or oxygen sensors, etc. If the canister load is relatively high, (e.g., no purge event has occurred since a recent refueling event) the canister may not be able to store additional hydrocarbons. Such an example may occur responsive to a refueling event wherein the fuel vapor canister was loaded, and wherein a subsequent purging operation was not performed. Accordingly, for engine lubrication conditions to be met at 705, conditions must be present wherein the fuel vapor canister was sufficiently cleaned during a purging event, the purging event comprising a fueled engine operation event, and wherein subsequent to purging the increment off timer was indicated to expire. Any other vehicle operating conditions that may result in a canister load lower than the threshold level and the increment off timer expired may further be understood as meeting the entry conditions for engine lubrication at 705.

If at 705, it is indicated that engine lubrication entry conditions are not met, in other words a key on event comprising a canister load lower than the threshold level is not indicated, method 700 may proceed to 710. At 710, method 700 may include maintaining the status of the engine, evaporative emissions control system, and fuel system. For example, if the increment off timer expires while the vehicle is operating in battery mode, the engine lubrication event may not take place until the next key on event wherein canister load is indicated to be below the threshold. Accordingly, evaporative emissions control system valves such as the canister purge valve, and canister vent valve, may be maintained in their current state. Furthermore, the position of the throttle, fuel tank isolation valve, status of the engine, and status of the vacuum pump (e.g., 295) may be maintained in their current state. Method 700 may then end.

Returning to 705, if it is indicated that engine lubrication entry conditions are met, in other words a key on event is indicated wherein a canister load is below the threshold, method 700 may proceed to 715. At 715, method 700 may include commanding open the CPV, closing the throttle, and commanding open the CVV. By opening the CPV, the engine intake may be coupled to the fuel vapor canister, and with the throttle closed, air and gases may be directed to the fuel vapor canister during the engine lubrication operation, as described in further detail below. With the CVV open, gases stripped of hydrocarbons exiting the fuel vapor canister may be released to atmosphere. Additionally, it may be understood that for a vehicle equipped with a fuel tank isolation valve, as is the case for PHEVs with sealed fuel tanks, the fuel tank isolation valve may be maintained closed.

Proceeding to 720, method 700 may include performing the engine lubrication operation. For example, performing the engine lubrication operation at 720 may comprise placing the pump (e.g., 295) in a conformation to draw a vacuum on engine intake, which may include placing a changeover valve in position to couple the fuel vapor canister to atmosphere via the pump, and activating the pump to draw vacuum on the fuel vapor canister and engine intake. Further, performing the engine lubrication operation at 720 may comprise spinning the engine unfueled in reverse. For example, an electric motor, such as a starter motor may be operated to spin the engine in reverse. The controller may be configured to disable spark and fuel injection. The engine may be spun unfueled at a predetermined speed, or a speed based on current operating conditions. For example, the speed at which the engine is spun in reverse may be based on ambient temperature, and/or engine temperature. For example, the engine may be spun at a higher speed if it is indicated that the ambient temperature and/or engine temperature is below a threshold, and at a lower speed if it is indicated that the ambient temperature and/or engine temperature is above a threshold. The duration which the engine is spun in reverse may similarly be based on ambient temperature and/or engine temperature. In one example, ambient temperature and/or engine temperature above a threshold may enable shorter duration reverse engine spinning, and ambient temperature and/or engine temperature below a threshold may enable longer duration reverse engine spinning. Furthermore, while the duration of reverse engine spinning may vary based on current operating conditions, it may be understood that the reverse engine spinning may comprise spinning the engine in reverse for the entire duration of the engine lubrication operation. Finally, performing an engine lubrication operation at 720 may further include activating an oil pump to lubricate the engine. In one example, the oil pump may be controlled by an electric motor, as described above with regard to FIG. 3. Further, oil injector 384 may be activated and it may be activated for a longer time than if the engine were operating in a fueled mode of operation.

During spinning the engine unfueled in reverse with the vacuum pump on to route the flow of air/vapor to the fuel vapor canister, fuel vapors stored in the AIS HC trap (e.g., 224) may be purged to the fuel vapor canister to be stored. Additionally, any uncombusted HC that may have accumulated in the cylinders and/or exhaust manifold may be vaporized and routed to the fuel vapor canister. Furthermore, as vacuum is directed at the intake manifold via the vacuum pump, a positive crankcase ventilation valve may be opened, thus drawing any blow by gases in the crankcase to the fuel vapor canister. In some examples, during performing the engine lubrication operation, a canister temperature sensor (e.g., 232) may be used to determine hydrocarbon adsorption within the fuel vapor canister. A temperature plateau may indicate that hydrocarbons are no longer being adsorbed, and the controller may infer that the AIS hydrocarbon trap, crankcase, cylinders, and exhaust manifold are sufficiently purged. As such, in some examples, the duration for which the engine is spun in reverse may be further based on an indication of a temperature plateau as monitored by the fuel vapor canister temperature sensor.

Proceeding to 735, method 700 may include stopping the engine spinning in reverse, and deactivating the vacuum pump. For example, as described above, the duration of engine spinning in reverse may be based on one or more of ambient temperature, engine temperature, and canister loading state. In some examples, stopping engine spinning and deactivating the ELCM pump may further comprise stopping oil injection to the engine. Responsive to an indication that the engine lubrication operation is completed, the electric motor may be commanded to stop spinning the engine in reverse. Furthermore, the pump may be deactivated, which may additionally include placing a changeover valve in a conformation that couples the fuel vapor canister to atmosphere.

Proceeding to 740, method 700 may include returning evaporative emissions system actuators to their default conformations prior to performing the engine lubrication operation. For example, the throttle may be commanded to the position it was in, and the canister purge valve may be commanded closed. In some examples, the canister vent valve may be maintained open, while in other examples, the canister vent valve may be commanded closed. For example, if the canister loading state was indicated to be above a threshold subsequent to the engine lubrication operation, then the canister vent valve may be commanded closed to prevent breakthrough of hydrocarbons to the atmosphere.

Continuing to 745, method 700 may include updating the canister load based on the engine lubrication operation. For example, as indicated above, the canister loading state may be estimated during the engine lubrication operation based on the canister temperature sensor. Accordingly, at 745 method 700 may include updating the canister load to reflect the additional HC adsorbed by the fuel vapor canister during the engine lubrication operation. As such, at 745, method 700 may additionally include updating a canister purge schedule based on the additional amount of HC indicated to be adsorbed during the engine lubrication operation. Proceeding to 750, method 700 may include resetting the increment off timer responsive to the indication that an engine lubrication operation was performed. Method 700 may then end.

FIG. 8 depicts an example timeline 800 for conducting an engine lubrication operation responsive to an indication that an engine increment off timer has expired using the methods described herein and with reference to FIGS. 5-7. Timeline 800 includes plot 810, indicating whether an engine increment off timer has expired, over time. Timeline 800 further includes plot 815, indicating whether a vehicle key-on event is indicated, over time. Timeline 800 further includes lot 820, indicating whether fueled engine operation is indicated, over time. Timeline 800 further includes plot 825, indicating a canister load, over time. Line 827 represents a threshold canister load, below which may indicate that an engine lubrication operation may be able to be conducted. Timeline 800 further includes plot 830, indicating the status of a vacuum pump (e.g., ELCM 295), over time. Timeline 800 further includes plot 835, indicating whether motor-driven rotation of the vehicle engine is indicated, over time. Timeline 800 further includes plot 840, indicating the open or closed state of a canister purge valve (CPV), and plot 845, indicating the open or closed state of a throttle, over time. Timeline 800 further includes plot 850, indicating whether an engine increment off time has been reset, over time.

At time $t_0$, the vehicle is in operation, indicated by plot 815. The vehicle is powered solely by battery power at $t_0$, as fueled engine operation is not indicated, represented by plot 820. The engine increment off timer has not expired, indicated by plot 810. Canister load, indicated by plot 825, is below a threshold, represented by line 827. As such, it may be assumed that a canister purge event may have occurred to clean the fuel vapor canister at an earlier time. The ELCM vacuum pump is off, indicated by plot 830. Motor driven rotation of the engine is not occurring, indicated by plot 835. The CPV is closed, indicated by plot 840, and the throttle is maintained in a position representative of the throttle position at engine shutoff, represented by plot 845. Furthermore, the increment off timer is not indicated to have been reset, as indicated by plot 850. Finally, while not shown in timeline 800, it may be understood that for vehicles equipped with a fuel tank isolation valve, and a canister vent valve, the fuel tank isolation valve may remain closed, and the canister vent valve maintained open, for the duration illustrated in timeline 800.

At time $t_1$, the engine increment off timer is indicated to expire. However, as the vehicle is in operation, entry conditions are not yet met for an engine lubrication operation. As described above, entry conditions for an engine lubrication operation may include an indication of a key-off to key-on event, and a canister load below a threshold. While at time $t_1$ it is indicated that canister load is below the threshold, as the vehicle is in operation entry conditions are not met. Accordingly, a flag may be set at the controller in order to schedule an engine lubrication operation at the next available opportunity, responsive to entry conditions being met.

At time $t_2$, the vehicle is turned off, represented by plot 815. The vehicle remains off for the duration of time between time $t_2$ and $t_3$. Accordingly, between time $t_2$ and $t_3$, canister load does not change as the fuel tank is sealed by a fuel tank isolation valve (e.g., 252), the ELCM remains off, the CPV remains closed, and throttle position remains unchanged.

At time $t_3$, a key on event is indicated. As such, entry conditions are met for an engine lubrication operation. As described above, entry conditions include a key-on event, and a canister load below the threshold, of which both conditions are satisfied at time $t_3$. As an engine lubrication was scheduled and entry conditions are met, the CPV is commanded open, the throttle commanded closed, the ELCM pump activated in vacuum mode, and the engine is driven to rotate in reverse. As described above, an electric motor, such as a starter motor may be operated to spin the engine in reverse, and the controller may be configured to disable spark and fuel injection. Spinning the engine unfueled may comprise spinning at a predetermined speed, or a speed based on current operating conditions, as described above with regard to FIG. 7. By spinning the engine in reverse and applying vacuum on the intake manifold via activation of the ELCM pump while the CPV is open and the throttle is closed, air and fuel vapors may be routed to the fuel vapor canister. While not shown in timeline 800, it may be understood that during the spinning of the engine unfueled in reverse, an oil pump may be activated in order to lubricate the engine. In some examples, the oil pump may be activated by an electric motor. Furthermore, while not shown in timeline 800, the evaporative emissions system may be configured with a normally open canister vent valve (e.g., 297), which may be maintained open during the engine lubrication operation such that air stripped of fuel vapor exiting the fuel vapor canister may be routed to atmosphere.

As described above with regard to FIG. 7, during the engine lubrication operation, fuel vapors may be desorbed from the AIS HC trap, and routed to the fuel vapor canister. Further, any uncombusted HC present in the intake manifold, exhaust manifold, cylinders, and crankcase may be vaporized and routed to the fuel vapor canister. Accordingly, between time $t_3$ and $t_4$ canister load is indicated to rise and plateau, as indicated by plot 825, monitored by a canister temperature sensor, for example. As described above with regard to FIG. 7, the duration of engine spinning in reverse during the engine lubrication operation may be based on one or more of engine temperature and ambient temperature, and may additionally or alternatively be based on an indicated plateau of the canister loading state. In this example illustration 800, as canister load is indicated to rise and plateau, the engine lubrication operation is indicated to be complete at time $t_4$. Accordingly, the motor driving the reverse engine rotation, and the ELCM pump, are deactivated. Furthermore, the throttle is returned to its default state where it was positioned prior to the engine lubrication operation, and the canister purge valve is commanded closed. An oil pump providing pressurized oil to the oil pump may be deactivated. As an engine lubrication operation was performed, the engine increment off timer may be reset, indicated by plot 850, and as such, the increment off time is no longer indicated to be expired, indicated by plot 810.

Between time $t_4$ and $t_5$, the vehicle remains in operation, indicated by plot 815. However, the vehicle is being powered solely by battery power, as fueled engine operation is not indicated, represented by plot 820. As the vehicle is being powered by battery power, and the fuel tank remains sealed by the fuel tank isolation valve, canister load does not change between time $t_4$ and $t_5$.

At time $t_5$, fueled engine operation is indicated. As described above with regard to FIG. 5, fueled engine operation may be the result of a driver requested vehicle output torque request above a threshold, if the vehicle comprises a parallel hybrid configuration, or may be the result of a battery state of charge (SOC) below a first minimum SOC1.

Between time $t_5$ and $t_6$, fueled engine operation is indicated, and the throttle position changes, indicated by plot 845, according to engine operating conditions. Canister load remains unchanged, as the fuel tank remains sealed by the fuel tank isolation valve. At time $t_6$, fueled engine operation is no longer indicated. As described above with regard to FIG. 6, fueled engine operation may be discontinued responsive to driver requested torque dropping below a threshold, or responsive to a battery SOC greater than a second upper threshold SOC2. As a fueled engine operation is indicated to be completed at time $t_6$, the engine increment off timer is reset, indicated by plot 850, and accordingly, the increment off timer has not been indicated to be expired since being reset at time $t_4$. Between time $t_6$ and $t_7$, the vehicle continues to operate in battery mode, indicated by plot 815.

In this way, responsive to an indication that an engine-off duration has reached a threshold engine-off duration, the engine may be activated in reverse in order to lubricate the engine and thereby prevent rust formation and the potential for the sticking of valve train components. Additionally, by activating an onboard vacuum pump, air and fuel vapors may be drawn to a fuel vapor storage canister in an evaporative emissions control system of the vehicle, wherein the fuel vapors may be stored and purged at a later time during fueled engine operation. The technical effect of performing engine lubrication operations in this way is to activate the engine unfueled in reverse, such that the activation does not require the unnecessary use of fuel to perform the operation, and wherein operating the engine in reverse serves to route fuel vapors, particularly fuel vapors desorbed from an air intake system hydrocarbon trap, and from the engine crankcase, to the fuel vapor canister. Accordingly, engine lubrication operations may be conducted without impacting fuel economy and without increasing undesired evaporative emissions.

The systems described herein and with reference to FIGS. 1-4B, along with the methods described herein and with reference to FIGS. 5-7, may enable one or more systems and one or more methods. In one example, a method comprises propelling a motor vehicle by at least an internal combustion engine which rotates in a default direction by combusting fuel; and responsive to an indication of a vehicle engine-off duration greater than an engine-off threshold, spinning the engine unfueled in a reverse direction opposite the default direction. In a first example of the method, the method further comprises storing fuel vapors in a fuel vapor canister, the fuel vapor canister configured within a vehicle evaporative emissions system; and wherein spinning the engine unfueled in reverse includes routing air and fuel vapors to the fuel vapor canister. A second example of the method optionally includes the first example and further includes wherein spinning the engine unfueled in reverse generates a vacuum in an exhaust manifold of the engine and a positive pressure in an intake manifold of the engine; and wherein the vacuum in the exhaust manifold of the engine and positive pressure in the intake manifold routes air and fuel vapors in the exhaust manifold and intake manifold to the fuel vapor canister. A third example of the method optionally includes any one or more or each of the first and second examples and further comprises applying a negative pressure to the evaporative emissions system and an intake manifold of the engine by activating an onboard vacuum pump; and wherein routing air and fuel vapors to the fuel vapor canister comprises activating the onboard vacuum pump to direct air and fuel vapors to the fuel vapor canister. A fourth example of the method optionally includes any one or more or each of the first through third examples and further comprises sequestering blow by vapors in a crankcase of the vehicle engine; fluidically coupling the crankcase to the intake manifold of the engine by a vacuum-actuated positive crankcase ventilation valve; wherein activating the vacuum pump opens the vacuum-actuated positive crankcase ventilation valve; and wherein routing air and fuel vapors to the fuel vapor canister comprises routing blow by vapors in the crankcase of the vehicle engine to the fuel vapor canister. A fifth example of the method optionally includes any one or more or each of the first through fourth examples and further comprises storing fuel vapors in an air intake system hydrocarbon trap in the intake manifold of the engine; and wherein activating the vacuum pump desorbs fuel vapors from the air intake system hydrocarbon trap, the desorbed fuel vapors routed to the fuel vapor canister. A sixth example of the method optionally includes any one or more or each of the first through fifth examples and further includes wherein spinning the engine unfueled in reverse further comprises: operating an electric motor to rotate the vehicle engine in the opposite direction from engine rotation during fueled engine operation. A seventh example of the method optionally includes any one or more or each of the first through sixth examples and further comprises fluidically coupling the fuel vapor canister to an engine intake manifold by opening a canister purge valve positioned between the vapor canister and the intake manifold; fluidically coupling the fuel vapor canister to atmosphere by opening a canister vent valve; fluidically coupling the engine intake manifold to atmosphere through a throttle; fluidically coupling the fuel vapor canister to a fuel tank by opening a fuel tank isolation valve; and wherein routing air and fuel vapors to the fuel vapor canister includes closing the throttle, closing the fuel tank isolation valve, opening the canister purge valve, and opening the canister vent valve. An eighth example of the method optionally includes any one or more or each of the first through seventh examples and further comprises monitoring a fuel vapor canister loading state; and wherein commencing spinning the engine unfueled in reverse further comprises the fuel vapor canister loading state below a threshold fuel vapor canister loading state. A ninth example of the method optionally includes any one or more or each of the first through eighth examples and further includes wherein the threshold fuel vapor canister loading state comprises a fuel vapor canister loading state where a predetermined amount of fuel vapor may be added to the fuel vapor canister to be stored without exceeding a loading capacity of the fuel vapor canister. A tenth example of the method optionally includes any one or more or each of the first through ninth examples and further includes wherein monitoring the fuel vapor canister loading state further comprises: monitoring the fuel vapor canister loading state during the spinning the engine unfueled in reverse; and stopping the spinning the engine unfueled in reverse responsive to the fuel vapor canister loading state above another threshold. An eleventh example of the method optionally includes any one or more or each of the first through tenth examples and further includes wherein the engine-off duration greater than an engine-off threshold includes a predetermined amount of time. A twelfth example of the method optionally includes any one or more or each of the first through eleventh examples and further wherein the engine-off duration greater than an engine-off threshold includes a predetermined number of miles driven by the vehicle.

Another example of a method comprises propelling a vehicle by either a battery driven electric motor (battery mode) or by an internal combustion engine; during operation in the battery mode, in response to a first condition discontinuing the battery mode and activating fueled engine combustion operation with the engine rotating in a default direction; and during operation in the battery mode, in response to a second condition activating unfueled engine operation in reverse with the engine rotating in a reverse direction from the default direction. In a first example of the method, the method further comprises activating fueled engine operation responsive to a driver requested vehicle wheel torque request greater than a threshold, or a battery state of charge lower than a battery charge threshold. A second example of the method optionally includes the first example and further comprises monitoring the engine and indicating an engine-off duration via an engine increment off timer; and activating unfueled engine operation in reverse responsive to an indication that a predetermined amount of time has elapsed without an engine-on event; wherein activating unfueled engine operation in reverse comprises operating an electric motor to rotate the engine in a reverse direction. A third example of the method optionally includes any one or more or each of the first and second examples and further comprises storing fuel vapors in a fuel vapor canister, the fuel vapor canister configured within a vehicle evaporative emissions control system; applying a negative pressure to the evaporative emissions control system and an intake manifold of the engine by activating an onboard vacuum pump; and wherein activating unfueled engine operation in reverse comprises activating the onboard pump to route air and fuel vapors to the fuel vapor canister. A fourth example of the method optionally includes any one or more or each of the first through third examples and further comprises fluidically coupling the fuel vapor canister to an engine intake manifold by opening a canister purge valve; fluidically coupling the fuel vapor canister to atmosphere by opening a canister vent valve; fluidically coupling the engine intake manifold to atmosphere through a throttle; fluidically coupling the fuel vapor canister to a fuel tank by opening a fuel tank isolation valve; and wherein routing air and fuel vapors to the fuel vapor canister includes closing the throttle, closing the fuel tank isolation valve, opening the canister purge valve, and opening the canister vent valve.

An example of a hybrid system for a vehicle which may be driven by either an electric motor or an internal combustion engine, comprises: the electric motor coupled to a battery and a drivetrain of a vehicle; the internal combustion engine coupled to the vehicle drivetrain and the electric motor, the engine having an intake manifold; a fuel vapor recovery system having a vapor storage canister coupled to a fuel tank of the vehicle through a fuel tank isolation valve, coupled to the intake manifold through a purge valve, and coupled to atmosphere through a canister vent valve; a controller, storing instructions in non-transitory memory, that when executed, cause the controller to: control the electric motor to propel the vehicle and shut off the engine while the vehicle is propelled by the electric motor; and, in response to the combustion engine being off for at least a predetermined time, rotating the combustion engine by the electric motor in a reverse direction from a direction rotated during combustion and disabling fuel delivery to the engine to prevent combustion. In a first example, the system further comprises a vacuum pump coupled to the canister vent valve and wherein the controller: while rotating the engine in the reverse direction without fuel, activates the vacuum pump and opens the purge valve and closes a throttle coupled to the intake manifold to force fuel vapors or oil vapors from the engine through the vapor storage canister for adsorption therein. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
propelling a motor vehicle by at least an internal combustion engine which rotates in a default direction by combusting fuel; and
responsive to an indication of a vehicle engine-off duration greater than an engine-off threshold, spinning the engine unfueled in a reverse direction opposite the default direction, wherein the engine-off duration greater than an engine-off threshold includes a predetermined amount of time.

2. The method of claim 1, further comprising:
storing fuel vapors in a fuel vapor canister, the fuel vapor canister configured within a vehicle evaporative emissions system; and
wherein spinning the engine unfueled in reverse includes routing air and fuel vapors to the fuel vapor canister.

3. The method of claim 2, wherein spinning the engine unfueled in reverse generates a vacuum in an exhaust manifold of the engine and a positive pressure in an intake manifold of the engine; and
wherein the vacuum in the exhaust manifold of the engine and positive pressure in the intake manifold routes air and fuel vapors in the exhaust manifold and intake manifold to the fuel vapor canister.

4. The method of claim 2, further comprising:
applying a negative pressure to the evaporative emissions system and an intake manifold of the engine by activating an onboard vacuum pump; and
wherein routing air and fuel vapors to the fuel vapor canister comprises activating the onboard vacuum pump to direct air and fuel vapors to the fuel vapor canister.

5. The method of claim 4, further comprising:
sequestering blow by vapors in a crankcase of the engine;
fluidically coupling the crankcase to the intake manifold of the engine by a vacuum-actuated positive crankcase ventilation valve;
wherein activating the vacuum pump opens the vacuum-actuated positive crankcase ventilation valve; and
wherein routing air and fuel vapors to the fuel vapor canister comprises routing blow by vapors in the crankcase of the engine to the fuel vapor canister.

6. The method of claim 4, further comprising:
storing fuel vapors in an air intake system hydrocarbon trap in the intake manifold of the engine; and
wherein activating the vacuum pump desorbs fuel vapors from the air intake system hydrocarbon trap, the desorbed fuel vapors routed to the fuel vapor canister.

7. The method of claim 1, wherein spinning the engine unfueled in reverse further comprises:
operating an electric motor to rotate the engine in the opposite direction from engine rotation during fueled engine operation.

8. The method of claim 3, further comprising:
fluidically coupling the fuel vapor canister to an engine intake manifold by opening a canister purge valve positioned between the vapor canister and the intake manifold;
fluidically coupling the fuel vapor canister to atmosphere by opening a canister vent valve;
fluidically coupling the engine intake manifold to atmosphere through a throttle;
fluidically coupling the fuel vapor canister to a fuel tank by opening a fuel tank isolation valve; and
wherein routing air and fuel vapors to the fuel vapor canister includes closing the throttle, closing the fuel tank isolation valve, opening the canister purge valve, and opening the canister vent valve.

9. The method of claim 2, further comprising:
monitoring a fuel vapor canister loading state; and
wherein commencing spinning the engine unfueled in reverse further comprises the fuel vapor canister loading state below a threshold fuel vapor canister loading state.

10. The method of claim 9, wherein the threshold fuel vapor canister loading state comprises a fuel vapor canister loading state where a predetermined amount of fuel vapor may be added to the fuel vapor canister to be stored without exceeding a loading capacity of the fuel vapor canister.

11. The method of claim 10, wherein monitoring the fuel vapor canister loading state further comprises:

monitoring the fuel vapor canister loading state during the spinning the engine unfueled in reverse; and stopping the spinning the engine unfueled in reverse responsive to the fuel vapor canister loading state above another threshold.

12. A method comprising:

propelling a vehicle by either a battery driven electric motor (battery mode) or by an internal combustion engine;

during operation in the battery mode, in response to a first condition discontinuing the battery mode and activating fueled engine combustion operation with the engine rotating in a default direction; and during operation in the battery mode, in response to a second condition activating unfueled engine operation in reverse with the engine rotating in a reverse direction from the default direction, wherein the second condition further comprises monitoring the engine and indicating an engine-off duration via an engine increment off timer, and activating unfueled engine operation in reverse responsive to an indication that a predetermined amount of time has elapsed without an engine-on event.

13. The method of claim 12, wherein the first condition further comprises:

activating fueled engine operation responsive to a driver requested vehicle wheel torque request greater than a threshold, or a battery state of charge lower than a battery charge threshold.

14. The method of claim 12, wherein activating unfueled engine operation in reverse comprises operating an electric motor to rotate the engine in a reverse direction.

15. The method of claim 12, further comprising:

storing fuel vapors in a fuel vapor canister, the fuel vapor canister configured within a vehicle evaporative emissions control system;

applying a negative pressure to the evaporative emissions control system and an intake manifold of the engine by activating an onboard vacuum pump; and wherein activating unfueled engine operation in reverse comprises activating the onboard pump to route air and fuel vapors to the fuel vapor canister.

16. The method of claim 15, further comprising:

fluidically coupling the fuel vapor canister to an engine intake manifold by opening a canister purge valve;

fluidically coupling the fuel vapor canister to atmosphere by opening a canister vent valve;

fluidically coupling the engine intake manifold to atmosphere through a throttle;

fluidically coupling the fuel vapor canister to a fuel tank by opening a fuel tank isolation valve; and wherein routing air and fuel vapors to the fuel vapor canister includes closing the throttle, closing the fuel tank isolation valve, opening the canister purge valve, and opening the canister vent valve.

17. A hybrid system for a vehicle which may be driven by either an electric motor or an internal combustion engine, comprising:

the electric motor coupled to a battery and a drivetrain of a vehicle;

the internal combustion engine coupled to the vehicle drivetrain and the electric motor, the engine having an intake manifold;

a fuel vapor recovery system having a vapor storage canister coupled to a fuel tank of the vehicle through a fuel tank isolation valve, coupled to the intake manifold through a purge valve, and coupled to atmosphere through a canister vent valve;

a controller, storing instructions in non-transitory memory, that when executed, cause the controller to: control the electric motor to propel the vehicle and shut off the engine while the vehicle is propelled by the electric motor; and, in response to the engine being off for an engine-off duration greater than an engine-off threshold includes a predetermined number of miles driven by the vehicle, rotating the engine by the electric motor in a reverse direction from a direction rotated during combustion and disabling fuel delivery to the engine to prevent combustion.

18. The system recited in claim 17 further comprising a vacuum pump coupled to the canister vent valve and wherein the controller: while rotating the engine in the reverse direction without fuel, activates the vacuum pump and opens the purge valve and closes a throttle coupled to the intake manifold to force fuel vapors or oil vapors from the engine to the vapor storage canister for adsorption therein.

* * * * *